United States Patent [19]

Boudy

[11] 4,350,128

[45] Sep. 21, 1982

[54] FUEL FLOW CONTROL SUPERCHARGED ENGINE

[75] Inventor: Jean-Pierre Boudy, Mennecy, France

[73] Assignee: Renault Sport, Viry-Chatillon, France

[21] Appl. No.: 203,884

[22] Filed: Nov. 4, 1980

[30] Foreign Application Priority Data

Nov. 15, 1979 [FR] France .................... 79 28257

[51] Int. Cl.³ .................... F02D 1/06; F02D 1/14
[52] U.S. Cl. .................... 123/369; 123/383; 123/385
[58] Field of Search .............. 123/383, 385, 369, 393, 123/382, 389, 372, 387

[56] References Cited

U.S. PATENT DOCUMENTS

| | | | |
|---|---|---|---|
| 2,374,411 | 11/1939 | Camner . | |
| 2,383,979 | 4/1942 | Lysholm . | |
| 2,670,724 | 3/1954 | Reggio | 123/383 |
| 3,015,326 | 1/1962 | Wirsching | 123/369 |
| 4,262,642 | 4/1981 | Sverdlin | 123/385 |
| 4,308,834 | 1/1982 | Eheim | 123/369 |

FOREIGN PATENT DOCUMENTS

| | | |
|---|---|---|
| 1131463 | 2/1957 | France . |
| 1407678 | 6/1965 | France . |
| 537028 | 6/1941 | United Kingdom . |
| 1271656 | 4/1972 | United Kingdom . |

Primary Examiner—Charles J. Myhre
Assistant Examiner—Carl Stuart Miller
Attorney, Agent, or Firm—Oblon, Fisher, Spivak, McClelland & Maier

[57] ABSTRACT

A fuel flow regulation device for a supercharged engine of the type having an injection pump whose piston's bottom position is determined by a moving stop, is disclosed. The fuel flow regulation device consists of a tridimensional cam contacting the stop and movable in an axial and a rotational direction. The axial movement of the cam is provided by a piston rod connected to a pair of pistons, one of which has a smaller diameter than the other by a predetermined amount, in which the pistons are oppositely subjected to engine intake pressure and engine exhaust pressure. The rotational movement of the cam is controlled by a jack subject to the output of a volumetric hydraulic pump actuated by the engine and pumping fluid from the engine cooling system.

8 Claims, 2 Drawing Figures

FUEL FLOW CONTROL SUPERCHARGED ENGINE

BACKGROUND OF THE INVENTION

1. Field of the Invention

The invention concerns the regulation of the fuel flow of a supercharged motor, in particular a turbocharged motor.

2. Description of the Prior Art

There are known devices providing such regulation by using an injection pump in which the travel of the pistons, or more precisely the bottom dead center position thereof, is controlled by a rotating tridimensional cam, or camoid, whose two principal movements, rotation and axial displacement, are controlled in the first instance by a piston acted upon by the pressure within the intake manifold as compared to atmospheric pressure and in the second instance by the opening of the gases valve by means of an appropriate rod system. The camoid is shaped in such a way that the pump provides a flow of fuel proportional to the flow of air through the motor. However, with such a device this proportionality is rather approximate; furthermore, the control rod system between the valve and the pump results in undue firmness of the accelerator pedal.

SUMMARY OF THE INVENTION

The object of the invention is to eliminate the above drawbacks by producing a regulation device which better adapts the fuel richness level under all circumstances without creating undue firmness of the accelerator pedal.

The invention consists in mounting, on the piston rod of the piston which is sensitive to intake pressure, a second and opposing piston with a reduced cross section in accordance with a particular reduction ratio, on which the exhaust pressure has an impact, with said piston rod activating not the rotation but preferably the axial displacement of the camoid, as well as in inducing the rotation of said camoid by means of a hydraulic jack which is subjected to pressure in proportion to the speed of the motor, said pressure being produced by a volumetric pump generating a flow through a constriction which can be regulated.

Preferably this second piston is of the membrane piston type so as to avoid any excessive increase in the temperature of the device. Finally, the hydraulic circuit controlling the above-mentioned jack is preferably fed by liquid from the motor's cooling system.

BRIEF DESCRIPTION OF THE DRAWINGS

Other particular features of the invention will emerge in the course of the following description of one mode of manufacture, which is taken as an example and represented in the attached drawings, in which.

DETAILED DESCRIPTION OF THE PREFERRED EMBODIMENTS

Figure 1:
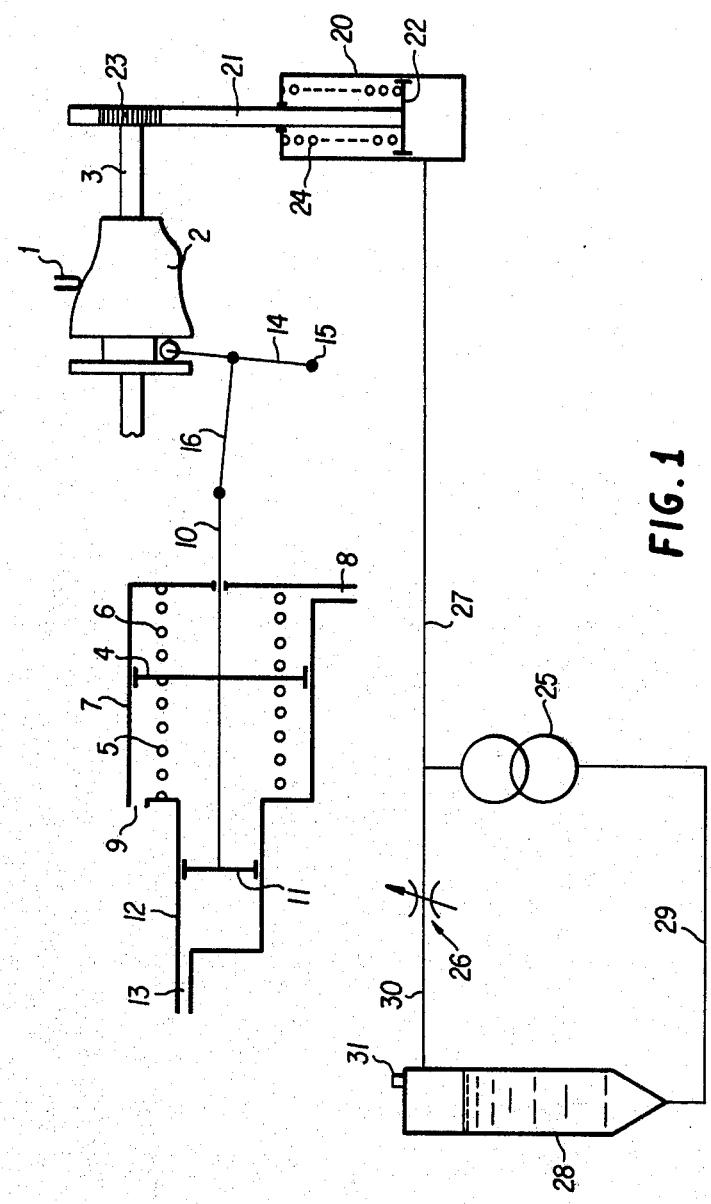
FIG. 1 is an overall schematic view of the device.

The injection pump, of a conventional type, has not been represented in FIG. 1, as is also the case for its bottom dead center stop mechanism which limits the extent of injection. All that has been shown is the cam push rod 1 activating the stop mechanism and itself being acted on in a conventional manner by a tridimensional cam 2 or camoid which is cottered onto a shaft 3 so as to slide and be able to rotate with that shaft and move along the length of that shaft, these two components of movement being commanded independently.

In the conventional arrangement, axial displacement is commanded by a rod system originating at the gas valve command, i.e., ultimately from the accelerator, while rotation is controlled by a piston balanced between two springs and subject on one surface to the intake pressure and on the other surface to atmospheric pressure. In this way, when the turbocompresser comes into play, this piston induces rotation in the camoid, which causes adaptation of the fuel flow to the increased flow of air resulting from this supercharging.

In the device according to the invention there is also a piston 4 balanced between two springs 5 and 6 pushing in opposite directions and which moves in a cylinder 7 which on one side 8 is tied into the intake pressure and on the other side 9 is subject to atmospheric pressure. On the other hand, in accordance with the invention, on the same piston rod 10 is attached a second piston 11 with a smaller cross section than that of the piston 4 by a given reduction ratio, in this case 0.45. Furthermore, this piston 11 moves in an appropriate cylinder 12 which opens into cylinder 7 and whose chamber end connects through 13 with the exhaust pressure. This pressure acts to oppose the intake pressure while the other chamber of cylinder 12 naturally connects the atmospheric pressure, still by way of 9.

The force acting on the piston rod 10, and consequently the equilibrium position of said piston rod which results from the effects of the springs 5 and 6, is therefore not a function of intake pressure alone, and is also not a direct function of the difference between the intake pressure and the exhaust pressure, instead being proportional to a function which has the form of $P2 - \alpha P3$, in which $\alpha$ is the ratio of reduction indicated above, of the order of magnitude of 0.45, while P2 is the intake pressure and P3 the exhaust pressure.

In addition, this piston rod 10 affects not the rotation of the camoid 2 but, preferably, the axial displacement, thereof by means of a known mechanism consisting of an operating finger 14 which revolves around an axis 15 and is controlled by a small rod 16.

Figure 2:
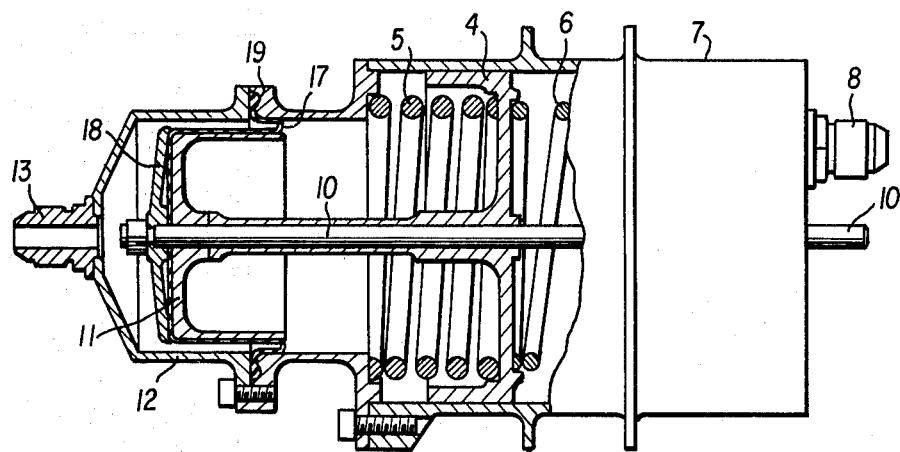
FIG. 2 is a partial cross section of the differential piston.

In the arrangement described here, care must be taken to prevent any gas leakage past the piston 11 in cylinder 12 which would result in the escaping exhaust gas bringing about an abnormal rise in the temperature of the mechanism. To prevent this, and as shown in FIG. 2, in accordance with the invention a membrane type piston 11 is used which has a flexible membrane 17 held fast to the head of the piston 11 by a disk 18 and also gripped on its outer periphery 19 in a joint seam between the two parts of the cylinder 12. This membrane rolls up on itself and returns in a known manner when the piston is displaced, while preventing any escape of gas. As a result, the transmittal of the exhaust gas pressure to the upstream chamber of the cylinder 12 through the conduit 13 is transmitted through a ballast of air or gas which does not circulate and consequently comes into temperature equilibrium at a relatively low temperature.

Moreover, according to the invention, the rotary movement of the camoid is obtained by inducing rotary movement in the shaft 3 by means of a tachometric device as a function of the real speed of the motor. Any tachometric device may be used, but in accordance with the invention it is preferable to use a hydraulic device consisting of a jack 20 whose piston 22 has a rod 21 which constitutes a rack which activates a pinion 23 attached to the end of the shaft. The lower chamber of said jack is subject to hydraulic pressure which is proportional to the speed of the motor while the upper chamber contains a return spring 24.

This hydraulic pressure proportional to the speed of the motor is brought about in a known manner with the help of a volumetric pump 25 powered by the motor, for example at a speed half that of the crankshaft, and propelling the liquid sucked up through a constriction 26 which may be adjustable, with the pressure thus obtained between the pump 25 and the constriction 26 being transmitted through tubing 27 to the jack 20.

In particular, the liquid used may be the motor cooling liquid drawing the same from the expansion receptacle 28 for the motor's radiator through tubing 29, while the outlet from the constriction 26 redirects the escaping liquid back to this expansion receptacle via line 30. To facilitate this use, it is preferable to add a high pressure additive of a known type to the motor cooling liquid so as to increase the liquid's viscosity to a value which changes only slightly with temperature.

Naturally, it is also desirable for the jack 20 to prevent any leakage of cooling liquid, which can also be accomplished by means of a membrane piston.

Finally, care must be taken to keep the overall pressure in the cooling circuit from assuming a value substantially greater than atmospheric pressure as this would be added to the pressure attributable to the speed of the motor and would falsely position the rod 21. To do this, one can use a pressure regulator of a known type, represented schematically at 31 in FIG. 1, limiting the internal pressure of the coolimg circuit to a constant value, 1.5 bar for example.

Thanks to the differential pneumatic correction and exact tachometric correction, the invention makes it possible to achieve better richness adjustment for all motor operation circumstances. Furthermore, the absence of a link between the gas valve and the injection pump eliminates the problems of undue firmness in the accelerator pedal as well as imprecise control of cam displacement. The system of rods is naturally simplified considerably. Finally, the device also makes it possible to take into account the counterscavenging of the motor during acceleration, which in a turbocharged motor may vary depending on the circumstances of that acceleration.

This improved adjustment of fuel richness to all circumstances results in improved performance and decreased fuel consumption.

Obviously, numerous modifications and variations of the present invention are possible in light of the above teachings. It is therefore to be understoo that within the scope of the appended claims, the invention may be practiced otherwise than as specifically described herein.

What is claimed as new and desired to be secured by letters patent of the United States is:

1. A fuel flow regulation device for a supercharged engine of the type having an injection pump whose piston's bottom position is determined by a moving stop, comprising:

a tridimensional cam contacting said stop, the movement of said cam in at least one of two movement components actuating the movement of said stop;

first means for actuating one of said movement components, said first means including a first piston balanced between two springs and subjected on one side to engine intake pressure and on the other side to atmospheric pressure, a second piston connected to said first piston and having a diameter smaller than that of said first piston by a predetermined ratio, said second piston being subjected to engine exhaust pressure on a side opposite said side of said first piston which is subjected to engine intake pressure, and a piston output connected between said pistons and said cam; and second means for actuating the other of said movement components, said second means including a tachometric device sensitive to the speed of rotation of said engine.

2. The device of claim 1 wherein said first means is a differential pneumatic control unit and acts on an axial movement component of said cam, and wherein said second means acts on a rotational movement component of said cam.

3. The device of claims 1 or 2 wherein said second piston is of the returning membrane type.

4. The device of claims 1 or 2 wherein said tachometric device comprises:

a hydraulic jack having an output connected to said cam by rack and pinion means for rotating said cam;

a volumetric hydraulic pump actuated by said engine, the output of said pump communicating with said jack for moving the output thereof, and a bypass, including an adjustable restriction, for the output of said hydraulic pump.

5. The device of claim 4 wherein said bypass, and the input of said hydraulic pump, are connected to the expansion fluid receptacle of the cooling system of said engine.

6. The device of claim 5 wherein the hydraulic fluid is water plus a high pressure additive.

7. The device of claim 5 wherein said expansion fluid receptacle includes a constant value pressure regulator.

8. The device of claim 7 wherein said pressure regulator is set at 1.5 bar.

* * * * *